United States Patent [19]

Kamiya

[11] Patent Number: 4,771,376
[45] Date of Patent: Sep. 13, 1988

[54] PROCESSOR

[75] Inventor: Shigeo Kamiya, Tokyo, Japan

[73] Assignee: Kabushiki Kaisha Toshiba, Kawasaki, Japan

[21] Appl. No.: 937,829

[22] Filed: Dec. 4, 1986

[30] Foreign Application Priority Data

Jan. 17, 1986 [JP] Japan ............................ 61-006385

[51] Int. Cl.[4] .............................................. G06F 1/00
[52] U.S. Cl. ..................................................... 364/200
[58] Field of Search ... 364/200 MS File, 900 MS File

[56] References Cited

U.S. PATENT DOCUMENTS 4,414,621 11/1983 Bown et al. ........................ 364/200

Primary Examiner—Raulfe B. Zache
Attorney, Agent, or Firm—Foley & Lardner, Schwartz, Jeffery, Schwaab, Mack, Blumenthal & Evans

[57] ABSTRACT

Computers are formed with different architecture to attain optimum functions or performances according to the usage and objects. For standardization of processors for implementing predetermined operations in accordance with instuctions supplied from an external device of a computer, an interpretation section for converting instructions supplied from the external device into internal instructions is so configured that the conversion method can be modified according to other computers of different architectures. For instance, when bit composition of the external instructions differs, a decode logic in the interpretation section is so configured as to be modified according to change in the bit composition. Further, when function of the external instruction differs, a microprogram storage section is so configured as to be modified according to change in the instruction function. When bit length of the external instructions differs, a bus control section is so configured as to be modified according to change in the instruction bit length.

8 Claims, 3 Drawing Sheets

PROCESSOR

BACKGROUND OF THE INVENTION

1. Field of the Invention

The present invention relates to a processor which can readily realize various computers of different architectures.

2. Description of the Prior Art

In general, computers are formed with different peculiar architectures so as to attain optimum functions and performances according to the usage and objects. Therefore, conventionally, when a computer having an architecture suitable for a specific usage is required, it has been necessary to newly design the specific computer.

Further, conventionally, in the case of computers of microprogram control method, various instructions for implementing specific functions corresponding to usages and objects have been prepared by modifying or adding microprograms composed of microinstructions in order to increase the availability for various specific usages. In these microcomputers of microprogram control method, although microprograms are modified or added, the architecture itself has never been modified.

Therefore, in order to develop computers provided with different functions and performances according to various usages and objects, there exists a problem such that various computers provided with various optimum architectures should be designed independently for each computer model, thus, uneconomical development cost being required for each model.

SUMMARY OF THE INVENTION

With these problems in mind, therefore, it is the primary object of the present invention to provide a processor which can readily realize optimum architectures corresponding to various functions and performances required for various usages and objects.

To achieve the above-mentioned object, the processor for implementing predetermined operations in accordance with instructions supplied from an external device of a computer, according to the present invention, comprises: (a) bus controlling means for supplying address information to the external device and inputting an instruction corresponding to the address information from the external device; (b) interpreting means for converting the instruction supplied from said bus controlling means into an internal construction, said interpreting means being so configured that the above conversion method can be modified according to other computers of different architecture; (c) microprogram controlling means for outputting a microprogram instruction corresponding to the internal instruction supplied from said interpreting means; and (d) calculating means for executing operations in accordance with the microprogram instruction supplied from said microprogram controlling means.

In summary, in a processor including instruction executing means for executing internal instructions in order to execute predetermined operations, the processor comprises, in particular, interpreting means for interpreting external instructions and converting these into internal instructions to be supplied to the instruction executing means.

In the processor according to the present invention, since instructions read out of the external device and supplied to the processor are converted into internal instructions through the interpretation section, and these internal instructions are executed to implement predetermined functions, when computers having different architectures in instruction bit composition, for instance, are required, it is possible to readily execute various instructions of different architectures by only modifying the interpretation section according to the supplied instructions and by converting the instructions into internal instructions of a predetermined form through the interpretation section. In other words, since it is possible to realize processors of different architectures by modifying only the interpretation section according to the supplied instructions, when a plurality of processors of different architectures are required to be configured, the production steps are simple and economical, and therefore the standardization of processors can be attained and the production management and stock management can be facilitated, because only the interpretation section is required to be modified according to the necessity.

BRIEF DESCRIPTION OF THE DRAWINGS

The features and advantages of the processor according to the present invention will be more clearly appreciated from the following description taken in conjunction with the accompanying drawings in which.

DETAILED DESCRIPTION OF THE PREFERRED EMBODIMENTS

An embodiment of the present invention will be described in further detail with reference to the attached drawings.

Figure 1A:
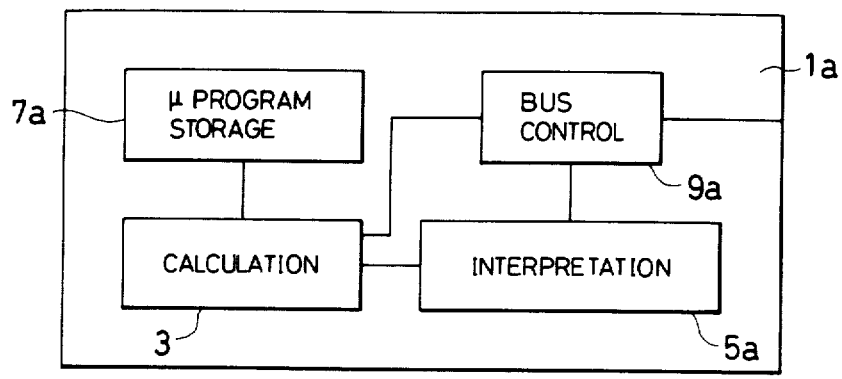
FIG. 1 (a) and (b) are block diagrams for showing two processors of different architectures related to one embodiment of the present invention.
Figure 1B:
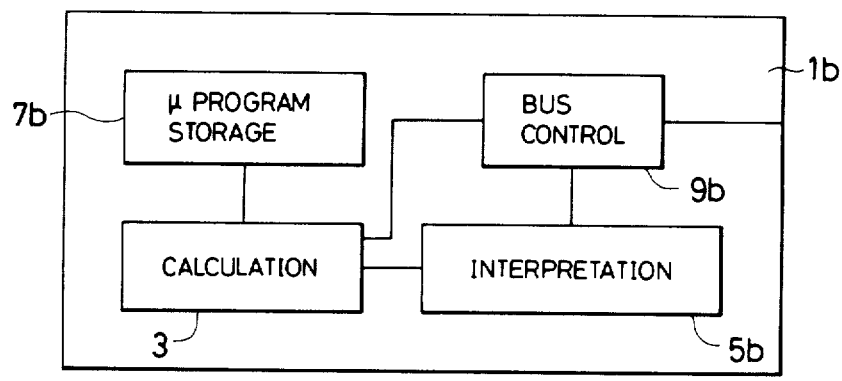

In FIGS. 1 (a) and (b), a first processor 1a shown in FIG. (a) is formed with a first architecture, and a second processor 1b shown in FIG. 1 (b) is formed with a second architecture. The first processor 1a is made up of a calculation section 3, an interpretation section 5a, a microprogram storage section 7a and a bus control section 9a. The second processor 1b is also made up of a calculation section 3, an interpretation section 5b, a microprogram storage section 7b and a bus control section 9b.

Both the processors 1a and 1b are of microprogram control type. Therefore, the same calculation section 3 can be adopted for both the processors; however, interpretation sections 5a and 5b, the microprogram storage sections 7a and 7b and the bus control sections 9a and 9b are different from each other according to the architecture. That is, in the processor 1 of the embodiment shown in FIG. 1, the general configuration including the calculation section 3, the interpretation section 5, the microprogram storage section 7 and the bus control section 9 is the same in both the processors 1a and 1b. However, it is possible to readily modify the architecture by modifying the interpretation section 5, the microprogram storage section 7, and the bus control section 9 in relation to the same calculation section 3.

In the description below, where each of the first and second processors 1a and 1b is explained separately, each suffix a or b is added to the reference numeral 1. However, where each of the processors 1a and 1b is explained in common, no suffix is added thereto.

Figure 2:
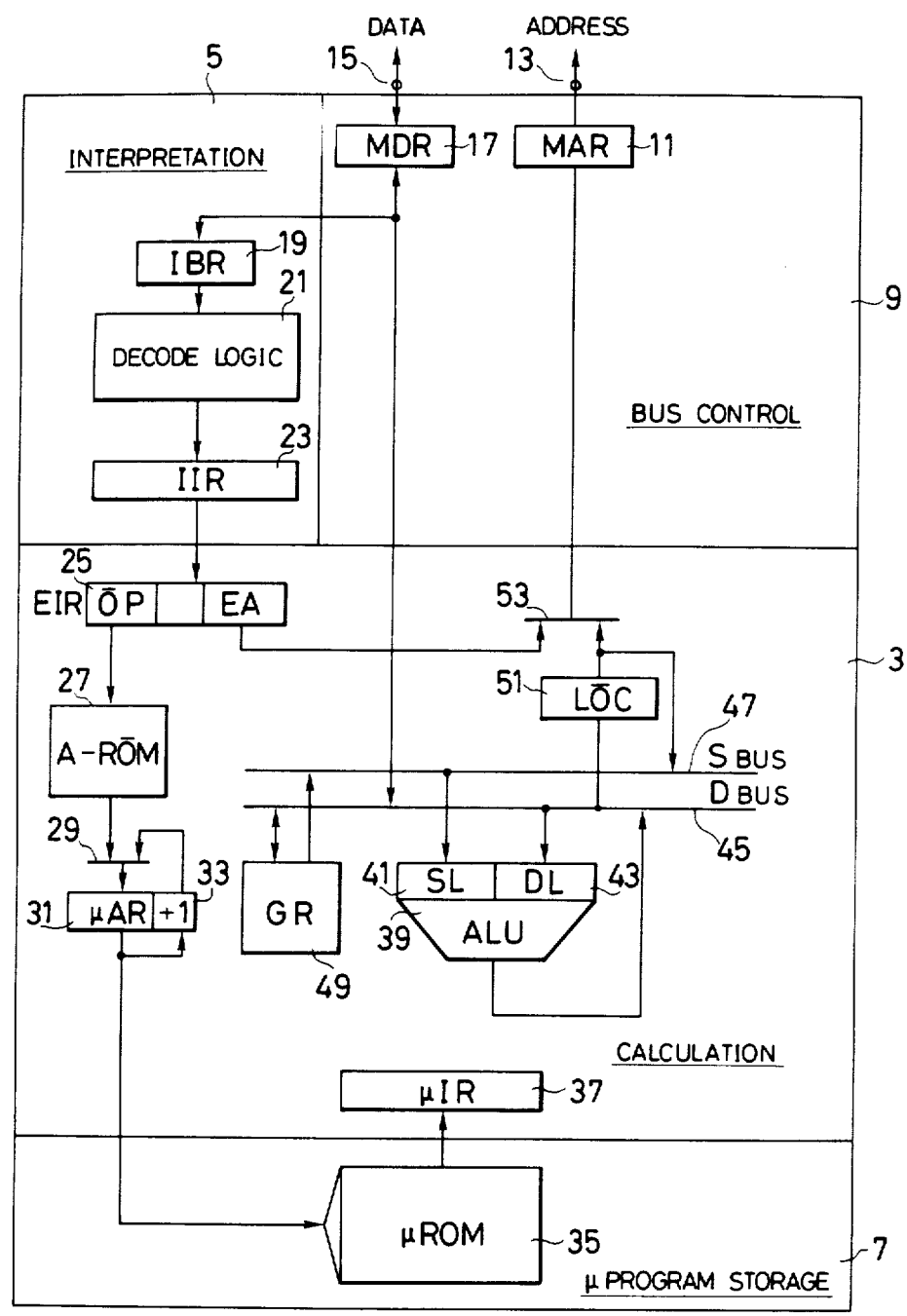
FIG. 2 is a more detailed block diagram of the processor shown in FIGS. 1a and 1b.

With reference to FIG. 2, the internal system configuration of the processor 1 will be described in further detail.

The processor 1 is connected to an external storage device (not shown) via an address bus 13 and a data bus 15 connected to the bus control section 9. This storage device receives address information from a memory address register 11 provided in the bus control section 9 via the address bus 13, and supplies an instruction stored at the corresponding received address of the storage device to a memory data register 17 provided in the bus control section 9 via the data bus 15. Although this processor 1 executes the instructions supplied from this storage device, since the processor 1 adopts a microprogram control method as already described, microprograms are stored in the microprogram storage section 7, and microinstructions stored in this storage section 7 are so executed by the calculation section 3 that predetermined functions corresponding to predetermined microprograms can diversely be executed. Further, the processor 1 is provided with internal instructions for designating predetermined programs to execute predetermined functions. Therefore, instructions supplied from the external storage device are converted into these internal instructions before being executed. In the description below, "instruction" signifies an instruction supplied from the external storage device to distinguish it from the internal instruction and microinstruction.

As described above, an instruction stored in the memory data register 17 is supplied to an instruction buffer register 19 in the interpretation section 5 and to a destination bus (DBUS) 45 in the calculation section 3. The instruction stored in the instruction buffer register 19 is supplied to a decode logic 21, being converted into an internal instruction corresponding thereto, and then supplied to an internal instruction register 23. The internal instruction supplied to this internal instruction register 23 is supplied to an execution instruction register 25 in the calculation section 3. In usual, the instruction and the internal instruction are each composed of operation codes and operands (including addresses). In this embodiment, the internal instruction stored in the execution instruction register 25 is divided into an operation code OP and an address field EA, and the operation code OP is supplied to an address ROM 27, and the address field EA indicative of an execution address of the operand is supplied to one input of a selector 53.

An address ROM 27 stores a top address of a microprogram stored in the microprogram storage section 7 and corresponding to an operation code OP of the internal instruction set in the execution instruction register 25, and outputs a top address corresponding to the operation code OP of the internal instruction supplied from the execution instruction register 25. This top address is set to a microaddress register 31 via a selector 29 and then supplied to a microROM 35 in the microprogram storage section 7 via a microaddress register 31. Further, an adder 33 is connected between the output of the microaddress register 31 and the other input of the selector 29 in order to update the address supplied to the microROM 35 by incrementing by one the address information outputted from the microaddress register 31.

The microROM 35 to which the top address of an internal instruction is supplied outputs a microinstruction stored at the address. This microinstruction is set from the microROM 35 to the microinstruction register 37, and executed or processed by an arithmetic and logic unit (referred to as ALU) 39 or an instruction decode control section (not shown) provided in the calculation section 3.

To two inputs of the ALU 39, a source latch (SL) 41 and a destination latch (DL) 43 are connected. In response to the information supplied from both the latches, four fundamental rule arithmetic operations, logical operations, comparison operations, etc. are effected in accordance with the microinstruction supplied from the microinstruction register 37. The two latches 41 and 43 are connected to a source bus (SBUS) 47 and a destination bus 45, respectively, and a general register 49 is connected to both the buses. The general register 49 is composed of a plurality of registers, and various processings such as information movement, operation and transfer, etc. between these registers are executed by the ALU 39.

Further, a location counter 51 is connected to the destination bus 45, and the output of this location counter 51 is connected to the source bus 47. This location counter 51 stores an address of an instruction now being executed. Immediately after the current instruction has been executed or in a predetermined step prior to the completion of the current instruction, the address stored in the location counter 51 is incremented to an address corresponding to the succeeding instruction by the ALU3 or other. The incremented address is set from the location counter 51 to the memory address register 11 via a selecter 53, and then supplied from this register 11 to the external storage device via the address bus 13, so that the succeeding instruction can be read from the external storage device.

As described above, although the processor 1 or the processors 1a and 1b include the same calculation section 3 as described above, the other sections such as the interpretation section 5, the microprogram storage section 7 and the bus control section 9 are different from each other according to architecture. However, it should be noted that there may exist various cases according to the degree of difference in architecture. In some cases, only the interpretation section 5 is different between the two processors 1a and 1b, and the microprogram storage section 7 and the bus control section 9 are the same in both the processors 1a and 1b. In other words, it is possible to configure two processors having different architectures, respectively, even if only the interpretation section 5 is different between the two and the other sections are the same in both.

The processor provided with different microprogram storage section 7 or different bus control section 9 will be described. For instance, where instructions are different in bit length, the bus control section 9 differs; where instructions are different in function or sort, the microprogram storage section 7 differs; where instructions are different in bit composition, that is, in format, only the interpretation section 5 differs, the other configuration being the same.

Prior to the description of the operation of the processor 1, the first and second processors 1a and 1b having different architectures respectively will be described with reference to instructions and internal instruction formats shown in FIG. 3.

Some examples having different bit compositions will be described hereinbelow. In the examples shown in FIG. 3, the architectures of both the processors 1a and 1b are different mainly in bit composition, that is, in instruction format. Therefore, with respect to the configuration of the processor 1 shown in FIG. 2, only the decode logic 21 of the interprotation section 5 is different in configuration, so that other configurations of the calculation section 3, the microprogram storage section 7, the bus control section 9 and the bit length of the instruction are all almost the same. However, it is of course possible to modify the function of instructions and internal instructions, bit compositions or the like by further modifying or adding only the microprogram composition in the microprogram storage section 7. In addition, the bit length of instructions can easily be changed by modifying the bus control section 9.

Figure 3:
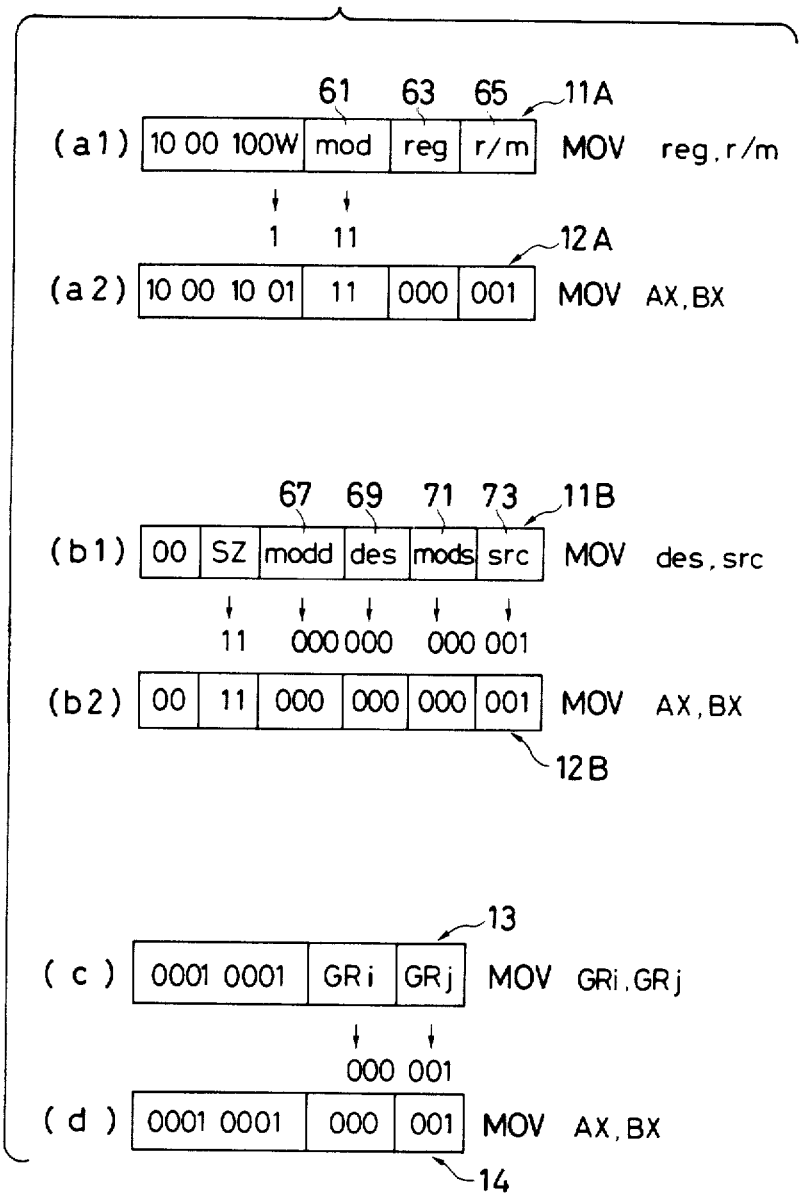
FIGS. 3(a1), 3(a2), 3(b1), 3(b2), 3(c) and 3(d) are instruction formats used for the processor shown in FIG. 1.

Each of two instruction formats 11A and 11B shown in FIGS. 3 (a1) and 3 (b1) is an example of information formats executed by the processors 1a and 1b, respectively, shown in FIG. 1 (a) and (b). Both the formats are those for data transfer instructions, that is, for MOV instructions. The instruction format 11A is an instruction indicative of "Transfer data from register/memory to register (MOVE REG R/M)"; the instruction format 11B is an instruction indicative of "Transfer data from source to destination (MOV DES SRC)".

The above two instructions are different in bit composition, as follows: In the instruction format 11A, reg section denoted by 63 designates a destination register; mod section denoted by 61 designates whether the source is a register or a memory; and r/m section denoted by 65 designates a source register or a source memory.

For instance, an instruction format 12A for transferring a data from a register BX (001) to a register AX (000) is shown in FIG. 3 (a2).

In the same way, in the instruction format 11B, modd section denoted by 67 designates whether the destination is a register or a memory; des section denoted by 69 designates a destination register or a destination memory; mods section denoted by 71 designates whether the source is a register or memory; and src section denoted by 73 designates a source register or a source memory. For instance, an instruction format 12B for transferring a data from a register BX (001) to a register AX (000) is shown in FIG. 3 (b2).

As shown in FIGS. 3 (a1) through (b2), the instruction format executed by the processor 1a or 1b and having a different bit composition due to the difference in architecture is supplied from the external storage device (not shown) to the processor 1a or 1b, and then converted into an internal instruction by the decode logic 21 in the interpretation section 5a or 5b so as to be executable by the calculation section 3 and the microprogram storage section 7.

That is, both the information formats 11A and 11B shown in FIGS. 3 (a1) and (b1) are converted into the same internal instruction format 13 as shown in FIG. 3(c) by the decode logic 21 of the interpretation section 5a or 5b of the processor 1a or 1b. The internal instruction of this internal instruction format 13 is "Transfer data from register GRj to register GRi" (MOV GRi GRj). The internal instruction format 14 of "Transfer data from register BX to register AX" as shown in FIG. (a2) or (b2) becomes that as shown in FIG. 3 (d). The conversion of two different formats 11A and 11B into the same internal instruction format 13 is the feature of the present invention. In summary, two instructions having the same function of "Transfer data" but having different bit compositions as shown in FIGS. 3 (a1) and (b1) due to different architectures of the processors 1a and 1b are converted by the different interpretation sections 5a and 5b into the same internal instruction format 13 of the same bit composition as shown in the FIG. 3 (c), before being executed by the calculation section 3.

The operation of the processor 1 will be described with reference to the information format shown in FIG. 3.

First, when an address information is supplied from a memory address register 11 of the bus control section 9 to the external storage device (not shown) via the address bus 13, the storage device supplies an address instruction, for instance, such as a data transferring instruction 12A or 12B as shown in FIG. 3 (a2) or (b2) to the memory register 17 of the bus control section 9 via the data bus 15. The instruction supplied from the storage device to the memory data register 17 is set to the instruction buffer register 19 in the interpretation section 5 and simultaneously supplied to the destination bus 45. The instruction set to the instruction buffer register 19 is converted into an internal instruction executable by the calculation section 3 through the data logic 21, that is, into the same internal instruction 13 as shown in FIG. 3 (c), for instance when the instruction from the storage device is the data transferring instruction 12A or 12B, and then set to the execution register 25.

With respect to the internal instruction set to the execution instruction register 25, the operation code op is supplied to the address ROM 27; a top address of the internal instruction is read out of the address ROM 27; and this top address is set to the microaddress register 31 via the selector 29.

This top address indicates a top address of a series of microprograms for executing the internal instruction set to the execution instruction register 25. By reading and executing microinstructions stored in the microROM 35 in sequence beginning from this top address, the internal instruction such as the internal data transferring instruction 14 can be executed.

That is to say, the top address set to the microaddress register 31 is supplied to the microROM 35; a microinstruction corresponding to the top address is outputted from the microROM 35 and then set to the microinstruction register 37.

The microinstructions set to the microinstruction register 37 as described above are executed by the ALU 39 under the control of a microinstruction decode control section (not shown) in the calculating section 3.

The execution operation of the microinstruction will be described hereinbelow by taking the above data transferring internal instruction as an example. In the case of the data transfer internal instruction 14 (MOV AX, BX), on the basis of the execution of a microinstruction first read from the microROM 35, a data designated by the register "BX" is read from the corresponding general register 49, and then latched by the source latch 41 via the source bus 47.

Upon the execution of the above first microinstruction read out of the microROM 35, the address of the microprogram in the microaddress register 31 is incremented by one through the adder 33, and then the incremented address is set to the microaddress register 31 as the succeeding address. The succeeding address thus set is supplied to the microROM 35, and the succeeding microinstruction is read out of the microROM 35 and set to the microinstruction register 37. In the execution of this microinstruction, a data latched by the source latch 41 on the basis of the previous microinstruction is latched by the destination latch 43 via the ALU 39. Therefore, in the same way, through the execution of the microinstructions read out of the microROM 35 in sequence, the data latched at the destination latch 43 is supplied to the general register 49 via the destination bus 45, set at the register of the general register 49 designated by the internal instruction "AX", so that the execution of the internal data transfer instruction 14 (MOV AX, BX) has been completed. That is, each instruction for the processor 1a or 1b as shown in FIG. 3 (a2) or (b2) is converted into the internal instruction as shown in FIG. 3 (d). The above processing is further repeated for plural microinstructions.

As described above, upon completion of the execution of one instruction read out of the storage device, the address now held in the location counter 51 as an address now being executed is incremented by one address (+1) by the ALU 39 or another control unit (not shown) to set the succeeding address at the location counter 51. The succeeding address thus set is outputted from the location counter 51 to the address bus 13 via the selector 53 and the memory address register 11, and the succeeding instruction is read out of the storage device for the same execution as described above. However, in the case where the instruction now executed is a jump instruction, for instance, the value of the address field EA of the internal instruction now being executed and stored in the instruction register 25 is supplied to the storage device as the succeeding address via the selector 53, without forming the succeeding address by simply adding one to the address held by the location counter 51, in order to execute an instruction at the succeeding address read out of the storage device.

As described above, even in processors 1a and 1b having different architectures, for instance, such as different instruction bit compositions, it is possible to readily realize the processor by only modifying the decode logic 21 in the interpretation section 5, thus it is possible to eliminate the conventionally required laborious development processes. Further, in the case where there are instructions dependent upon only one of the processors 1a and 1b (instructions for the processors 1a and 1b are not necessarily the same), it is necessary for the microROM 35 to store a more increasing number of microprograms corresponding to the instructions. In this case, the microROM 35 may be arranged separately.

The above embodiment has been described of the processor 1 of microprogram control method; however, without being limited to the microprogram control type processor, the present invention can be of course applied to other processors of wire-logic configuration.

Further, although the present invention has been described of the case where ROMs are incorporated in the microprocessor, without being limited thereto, it is of course possible to use programmable logic arrays.

What is claimed is:

1. A processor implementing predetermined operations in accordance with instructions supplied from an external device of a computer, which comprises:
   (a) interpreting means for performing a conversion operation to convert instructions supplied from the external device into internal instructions, said means being so configured that the conversion operation can be modified according to other computers of different architectures; and
   (b) instruction executing means for executing the predetermined operations in accordance with the internal instructions converted by said interpreting means.

2. The processor as set forth in claim 1, wherein said interpreting means comprises decode logic means for converting the instructions supplied from the external device into the internal instructions corresponding thereto, said decode logic means being so configured as to be modified according to a change in bit composition of the instructions supplied from the external device.

3. The processor as set forth in claim 2, wherein said instruction executing means comprises:
   (a) microprogram controlling means for outputting microprograms corresponding to the internal instructions supplied from said interpreting means; and
   (b) calculating means for executing the microprograms supplied from said microprogram controlling means.

4. The processor as set forth in claim 3, wherein said microprogram controlling means comprises microprogram storing means for storing the microprograms corresponding to the internal instructions supplied from said interpreting means, said microprogram storing means being so configured as to be modified according to a change in function of the instructions supplied from the external device.

5. The processor as set forth in claim 3, wherein said processor further comprises bus controlling means including:
   (a) a memory address register for supplying address information to the external device; and
   (b) a memory data register for supplying instructions corresponding to the address information to said interpreting means.

6. A processor as set forth in claim 5, wherein said bus controlling means is so configured as to be modified according to a change in bit length of the instructions supplied from the external device.

7. A processor as set forth in claim 5, wherein said calculating means comprises an arithmetic and logic unit for implementing operation processings in accordance with microprograms supplied from said microprogram controlling means.

8. A processor for implementing predetermined operations in accordance with instructions supplied from an external device of a computer, which comprises:
   (a) bus controlling means for supplying address information to the external device and inputting an instruction corresponding to the address information from the external device;
   (b) interpreting means for performing a conversion operation to convert the instruction supplied from said bus controlling means into an internal instruction, said interpreting means being so configured that the conversion operation can be modified according to other computers of different architecture;
   (c) microprogram controlling means for outputting a microprogram instruction corresponding to the internal instruction supplied from said interpreting means; and
   (d) calculating means for executing operations in accordance with the microprogram instruction supplied from said microprogram controlling means.

* * * * *